United States Patent
Yasuda et al.

(10) Patent No.: US 12,033,842 B2
(45) Date of Patent: Jul. 9, 2024

(54) MASS SPECTROMETER AND METHOD OF CONTROLLING THE SAME

(71) Applicant: Hitachi High-Tech Corporation, Tokyo (JP)

(72) Inventors: Hiroyuki Yasuda, Tokyo (JP); Yuichiro Hashimoto, Tokyo (JP); Yuka Sugawara, Tokyo (JP); Riku Tamura, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 368 days.

(21) Appl. No.: 17/628,388

(22) PCT Filed: Jul. 22, 2020

(86) PCT No.: PCT/JP2020/028373
§ 371 (c)(1),
(2) Date: Jan. 19, 2022

(87) PCT Pub. No.: WO2021/020260
PCT Pub. Date: Feb. 4, 2021

(65) Prior Publication Data
US 2022/0270868 A1   Aug. 25, 2022

(30) Foreign Application Priority Data
Jul. 26, 2019   (JP) .................. 2019-138005

(51) Int. Cl.
*H01J 49/06*   (2006.01)
*G01N 30/72*   (2006.01)
(Continued)

(52) U.S. Cl.
CPC ............ *H01J 49/063* (2013.01); *G01N 30/72* (2013.01); *G01N 35/00584* (2013.01);
(Continued)

(58) Field of Classification Search
CPC .......... H01J 49/063; H01J 49/24; H01J 49/42; G01N 35/00584; G01N 30/72
See application file for complete search history.

(56) References Cited

U.S. PATENT DOCUMENTS

| 2013/0032711 A1* | 2/2013 | Ishiguro | H01J 49/0013 |
| | | | 250/288 |
| 2015/0102232 A1 | 4/2015 | Satake et al. | |

(Continued)

FOREIGN PATENT DOCUMENTS

| JP | S 61-292847 A | * 12/1986 |
| JP | S61-292847 A | 12/1986 |

(Continued)

OTHER PUBLICATIONS

International Search Report, mailed Oct. 20, 2020, for International Application No. PCT/JP2020/028373.

(Continued)

*Primary Examiner* — David E Smith
*Assistant Examiner* — Hsien C Tsai
(74) *Attorney, Agent, or Firm* — Baker Botts L.L.P.

(57) ABSTRACT

There is provided a mass spectrometer that can appropriately maintain the atmospheric pressure of a vacuum chamber, and a method of controlling the same. An example of a mass spectrometer according to the present invention includes first vacuum chambers, first vacuum pumps, an atmospheric pressure relating value acquiring unit, and an adjustment unit configured to adjust the effective exhaust velocity of the first vacuum pumps, and controllers. The controllers control the adjustment unit corresponding to an atmospheric pressure relating value.

8 Claims, 5 Drawing Sheets

(51) Int. Cl.
*G01N 35/00* (2006.01)
*H01J 49/24* (2006.01)
*H01J 49/42* (2006.01)
*G01N 30/32* (2006.01)

(52) U.S. Cl.
CPC .............. *H01J 49/24* (2013.01); *H01J 49/42* (2013.01); *G01N 2030/326* (2013.01); *G01N 2030/328* (2013.01)

(56) References Cited

U.S. PATENT DOCUMENTS

| | | | | |
|---|---|---|---|---|
| 2016/0203944 | A1* | 7/2016 | Ominami | H01J 37/263 250/310 |
| 2020/0209410 | A1 | 7/2020 | Kashiwa | |
| 2020/0386779 | A1 | 12/2020 | Inaba et al. | |

FOREIGN PATENT DOCUMENTS

| | | |
|---|---|---|
| JP | H07-142025 A | 6/1995 |
| JP | 2001-021537 A | 1/2001 |
| JP | 2001-305118 A | 10/2001 |
| JP | 2003-132836 A | 5/2003 |
| JP | 2013-037815 A | 2/2013 |
| JP | 2015-201449 A | 11/2015 |
| JP | 2018-159682 A | 10/2018 |
| WO | WO 2019/003374 A1 | 1/2019 |

OTHER PUBLICATIONS

Office Action, mailed Oct. 31, 2023, for Japanese Application No. 2021-536990 (without English translation).

* cited by examiner

MASS SPECTROMETER AND METHOD OF CONTROLLING THE SAME

TECHNICAL FIELD

The present invention relates to a mass spectrometer and a method of controlling the same.

BACKGROUND ART

A mass spectrometer is a device that adds electric charges to sample molecules for ionization, separates the created ions according to mass-to-charge ratios using an electric field or a magnetic field, and measures the amount of separated ions as a current value using a detector. The mass spectrometer is of high sensitivity and has an excellent capacity of quantitative determination and identification compared with other analyzers. In recent years, in the field of life science, attention has been paid to peptide analysis or metabolite analysis, instead of genomic analysis, and the effectiveness of the mass spectrometer having high sensitivity and excellent capability of identification and quantification has been re-evaluated.

In regard to the mass spectrometer, some types are named from its principle. As mass spectrometers, which are presently mainly used, a Quadrupole Mass Spectrometer (QMS) is named.

The quadrupole mass spectrometer is a mass spectrometer in which four cylinders or poles with a hyperboloid are used as electrode and a radio-frequency voltage and a direct-current voltage are applied for mass separation. With the application of a radio-frequency voltage, a quadrupole electric field is formed between the electrodes, and a pseudo-square-well potential is formed to converge ions between the electrodes. At this time, when a direct-current voltage is overlaid, ions at a specific mass-to-charge ratio can be transmitted, the ions are transported to the detector, and the amount of the ions can be measured.

Since the mass-to-charge ratio of the ions to be transmitted is varied depending on the voltage ratio of the direct-current voltage to the ac voltage, sweeping the voltage ratio in a predetermined range causes various ions to reach the detector in the order corresponding to the mass-to-charge ratio, and the mass spectrum can be obtained. Since the quadrupole mass spectrometer is capable of sequential measurement and has a wide dynamic range of the detector, the quadrupole mass spectrometer has a merit of high quantification capacity.

In the mass spectrometer, the voltage to be applied to the electrode is controlled to form an electric field, and this electric field is changed. Thus, ions having electric charges are electrically operated to draw a specific orbit corresponding to the mass-to-charge ratio, and the ions are separated. Generally, the analysis unit of the quadrupole mass spectrometer is disposed in a vacuum chamber at about $10^{-3}$ pascals in order not to inhibit the motion of ions due to a collision against neutral molecules.

However, since the pressure of an ion source that forms ions are at an atmospheric pressure, it is effective to achieve the vacuum degree of an analysis chamber by differential pumping using a plurality of vacuum chambers. Generally, differential pumping is formed of vacuum chambers and vacuum pumps in a plurality of stages (e.g., two stags or three stages), and an ion guide that transports ions disposed in the inside. The ion guide is also an electrode that electrically guides and transports ions to the analysis chamber. For the ion guide, a multipole ion guide, for example, is used, and the ion guide is formed of an ion guide in which a parallel-plate is disposed, or formed of a hexapole, an octopole, and the like. The pressure of the vacuum chamber in which the ion guide is disposed ranges from a few hundreds pascals to about a few pascals, and the mean free process of molecules is small, so that ions are transported to the analysis chamber with the electric field while colliding against neutral molecules in the inside.

As Patent Literatures disclosing examples of technologies controlling the vacuum degree in the analyzer, Patent Literature 1 to Patent Literature 3 are named.

Noted that as harmful influences of such an ion guide, its electric field has mass dependence and sample dependence. The mass-to-charge ratio of ions to be measured by the mass spectrometer depends on samples, and the mass widely ranges from a few tens to a few thousands [m/z]. Therefore, the force of convergence that is necessary to transmit ions through a through hole and the degree of deceleration of ions due to a collision cross sectional area are varied depending on the mass. Since the binding force between atoms is weak in a specific sample, a plurality of times of collisions against the neutral molecule by the ion guide cleaves the bond, which sometimes results in the difficulty of maintaining the structure. In order to suppress these harmful influences, the creation of an electric field matching the sample is sometimes effective. For example, voltages to be applied to the electrodes are optimized matching a sample, and a voltage at which the ions of the sample are most transmitted can be set.

CITATION LIST

Patent Literature

Patent Literature 1: Japanese Unexamined Patent Application Publication No. 2018-159682
Patent Literature 2: Japanese Unexamined Patent Application Publication No. 2013-37815
Patent Literature 3: Japanese Unexamined Patent Application Publication No. 2001-305118

SUMMARY OF INVENTION

Technical Problem

However, in conventional technologies, there is a problem that it is difficult to appropriately maintain the atmospheric pressure of the vacuum chamber.

For example, the vacuum chamber in differential pumping in which the ion guide is disposed easily affected by the influence of the outside air pressure. Generally, although an atmospheric pressure at one atom is 101.3 kPa, when the installation environment is at an altitude of 3,000 m, the outside air pressure changes to 70.1 kPa, and the pressure of the vacuum chamber in differential pumping is also similarly decreased to about 0.5 to 0.7 times.

A change in the vacuum degree around the ion guide due to no appropriate maintenance of the atmospheric pressure of the vacuum chamber (e.g., a decrease in the atmospheric pressure) leads to a change in the frequency of the collision against neutral molecules (e.g., a decrease), and a necessary force of convergence also changes. As a result, this leads to a harmful influence such as a decrease in sensitivity. Generally, in the case in which such fluctuations in the pressure of the vacuum chamber occur, operations are necessary in which samples are again introduced into the mass spectrometer and electrode voltages are optimized. The more the number of samples increases, the more the workload increases, and the workload increases as well depending on the combinations of samples. In the case in which a sample is rare, such additional operations are not desirable.

The present invention has been made to solve such problems. It is an object to provide a mass spectrometer that is capable of more appropriately maintain the atmospheric pressure of a vacuum chamber and a method of controlling the same.

Solution to Problem

An example of amass spectrometer according to the present invention includes a first vacuum chamber, a first vacuum pump, an atmospheric pressure relating value acquiring unit, an adjustment unit configured to adjust an effective exhaust velocity of the first vacuum pump, and a controller. The controller controls the adjustment unit corresponding to the atmospheric pressure relating value.

An example of a method of controlling amass spectrometer according to the present invention is a method of controlling amass spectrometer including a first vacuum chamber, a first vacuum pump, an atmospheric pressure relating value acquiring unit, an adjustment unit configured to adjust an effective exhaust velocity of the first vacuum pump, and a controller, and in the method, the controller acquires an atmospheric pressure relating value, and controls the adjustment unit corresponding to the atmospheric pressure relating value. The present specification incorporates the content of the disclosure of Japanese Patent Application No. 2019-138005 which is the basis of the priority of the present application.

Advantageous Effects of Invention

According to the present invention, in the mass spectrometer, it is possible to more appropriately maintain the atmospheric pressure of the vacuum chamber.

DESCRIPTION OF EMBODIMENTS

In the following, embodiments of the present invention will be described with reference to the accompanying drawings.

First Embodiment

Figure 1A:
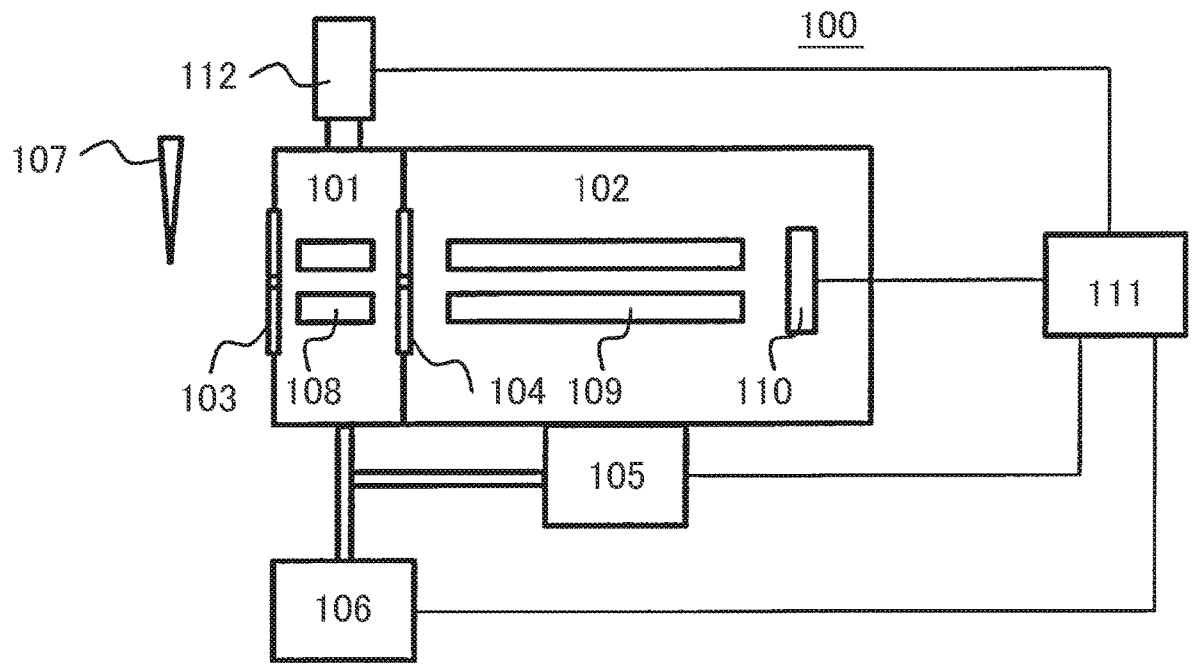
FIG. 1A is a diagram showing an exemplary schematic configuration of a mass spectrometer according to a first embodiment of the present invention.
Figure 1B:
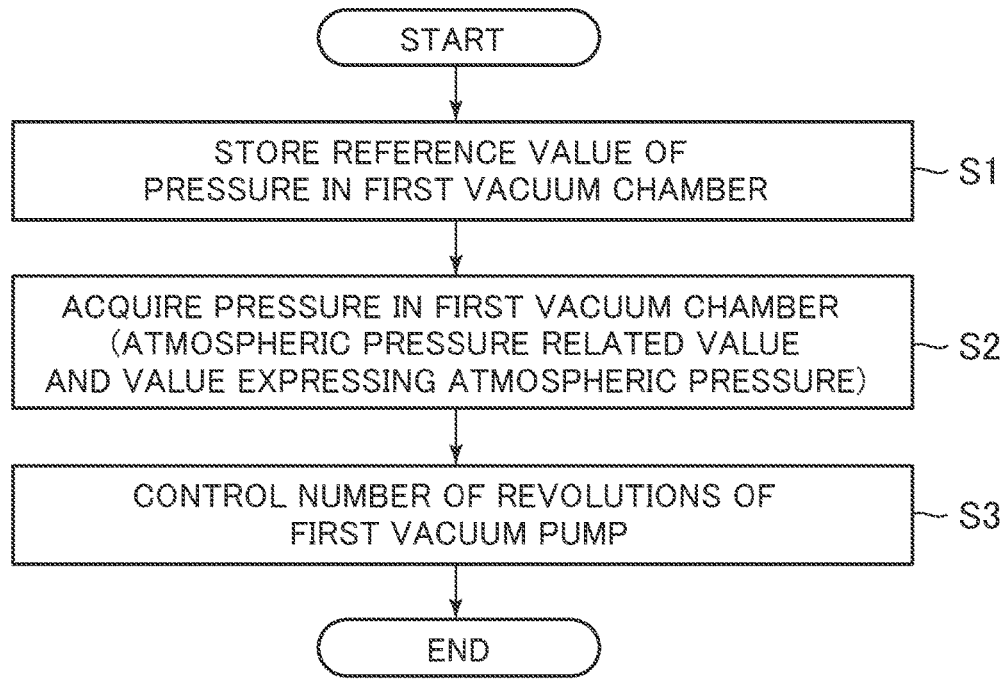
FIG. 1B is a flowchart showing an exemplary control method for the mass spectrometer.

FIG. 1 shows an exemplary schematic configuration of a mass spectrometer 100 according to a first embodiment of the present invention and the like. Specifically, FIG. 1(a) shows an exemplary schematic configuration, and FIG. 1(b) shows an example of a control method of the mass spectrometer 100.

The mass spectrometer 100 may be a device referred to as a mass spectrometer, specifically, the mass spectrometer 100 may be configured as a quadrupole mass spectrometer. The mass spectrometer 100 is placed under an atmospheric pressure environment, and includes vacuum chambers in two stages for differential pumping. The vacuum chamber in the first stage in differential pumping is a first vacuum chamber 101, and the vacuum chamber in the subsequent stage is a second vacuum chamber 102. The number of vacuum chambers may be three or more. A configuration including a single stage (e.g., a configuration in which no second vacuum chamber 102 is included, i.e., no differential pumping is performed) is not specifically excluded.

The mass spectrometer 100 includes a through hole through which a gas is passed in relation to these vacuum chambers. The through hole is formed, for example, a through hole, and for example, the diameter ranges from about 0.4 to 2.0 mm or about 0.2 to 0.8 mm. A first through hole 103 communicates the atmosphere with the first vacuum chamber 101, and a second through hole 104 communicates the first vacuum chamber 101 with the second vacuum chamber 102. Between the atmosphere and the second vacuum chamber 102, no through hole is provided.

The mass spectrometer 100 includes a vacuum pump. In the present embodiment, the vacuum pump includes a first vacuum pump 106 and a second vacuum pump 105. The first vacuum pump 106 is connected to the first vacuum chamber 101, and evacuates air from the first vacuum chamber 101. This decreases the pressure of the first vacuum chamber 101 is decreased, which becomes below an atmospheric pressure. The second vacuum pump 105 is connected to the second vacuum chamber 102, and evacuates air from the second vacuum chamber 102. This decreases the pressure of the second vacuum chamber 102 is decreased, which becomes below the pressure of the first vacuum chamber 101.

Although the pressures of the vacuum chambers when mass analysis operation is performed can be appropriately determined suitable for the configuration of the ion guide and the like, in the present embodiment, the pressure of the first vacuum chamber 101 is set at about a few hundreds pascals, and the pressure of the second vacuum chamber 102 is set at about a few pascals. When the second vacuum pump 105 is configured of a turbomolecular pump, for example, a necessary high vacuum can be achieved.

In the present embodiment, the first vacuum pump 106 also functions as a fore pump for the second vacuum pump 105. Therefore, the first vacuum pump 106 is also referred to as a coarsely ground pump. Such a configuration is effective in the case in which the second vacuum pump 105 is unable to directly drop the pressure from the atmospheric pressure to a necessary vacuum.

Next, the operation relating to analysis of the mass spectrometer 100 will be described. In the present embodiment, first, the first vacuum pump 106 is operated to operation to drop the pressures of the first vacuum chamber 101 and the second vacuum chamber 102 to about a few hundreds pascals. After that, the second vacuum pump 105 is operated to drop the pressure of the second vacuum chamber 102 to about a few pascals.

After a predetermined vacuum degree is attained in the vacuum chambers, ions can be measured in the mass spectrometer. The mass spectrometer 100 includes an ion source 107, an ion guide 108, an electrode 109, a detector 110, and a controller 111.

The ion source 107 applies a voltage of a few kV using a direct current power supply to ionize a sample. Ions positively or negatively charged pass the first through hole 103, and are introduced into the inside of the first vacuum chamber 101.

In the inside of the first vacuum chamber 101, the ion guide 108 is disposed, and the ion guide 108 transports ions to the second vacuum chamber 102. As an example of the ion guide 108, a multipole ion guide can be used. Examples of the multipole ion guide include configurations such as an ion guide in which a parallel-plate is disposed, a hexapole, and an octopole. With the application of a voltage to the electrode of the ion guide 108, ions are transported. The ions to be transported pass the second through hole 104, and are introduced into the inside of the second vacuum chamber 102.

In the inside of the second vacuum chamber 102, the electrode 109 is disposed as the subsequent stage of the ion guide 108. The electrode 109 is, for example, a quadrupole that generates a linear quadrupole electric field. The electrode 109 guides ions by overlaying a radio-frequency voltage on a direct-current voltage for application. On the subsequent stage of the electrode 109, the detector 110 is disposed, and a part of the ions guided by the electrode 109 reach the detector 110. Here, since the mass-to-charge ratio of ions that reach the detector 110 is varied corresponding to the voltage ratio of the direct-current voltage to the radio-frequency voltage, this voltage ratio is set to a specific value, and thus only ions having the specific mass-to-charge ratio can be reached to the detector 110. The detector 110 converts the electric charges of ions that are reached into an electrical signal and transmits the electrical signal to the controller 111. The controller 111 receives and stores this electrical signal, and performs a conversion process to a digital signal and a data operation process.

The controller 111 is configured as a computer having a publicly known configuration, including an operation unit such as a processor and a storage unit such as a semiconductor memory. The storage unit may store a program. The operation unit may execute this program, and the controller 111 may achieve the functions described in the present specification.

Here, pressure formation in the vacuum chambers in the present embodiment will be described. The pressure of the vacuum chamber is determined depending on an inflow $Q_{in}$ of a gas that enters the vacuum chamber and an outflow $Q_{out}$ of a gas that goes out from the vacuum chamber (e.g., a gas that is evacuated with the vacuum pump and the like). The inflow $Q_{in}$ is expressed by Expression 1 using a conductance C at a through hole to the inflow source and the pressure of the inflow source, i.e., an atmospheric pressure $P_0$.

$$Q_{in} = P_0 \cdot C \qquad \text{Expression 1}$$

Noted that it can be said that $P_0$ is a pressure on the high side of the through hole that is sandwiched. The conductance C expresses the ease of flowing a fluid, and is determined depending on shapes such as the diameter and length of the through hole, the properties of a fluid carried through the inside (a viscous flow, an intermediate flow, and a molecular flow).

The outflow $Q_{out}$ is expressed by Expression 2 using the pressure of the vacuum chamber $P_1$ and an effective exhaust velocity S of the vacuum pump connected to the vacuum chamber.

$$Q_{out} = P_1 \cdot S \qquad \text{Expression 2}$$

Since making $Q_{in}$ equal to $Q_{out}$ stabilizes the vacuum chamber at a constant pressure the pressure of the vacuum chamber when stabilized can be predicted by Expression 3.

$$P_0 \cdot C = P_1 \cdot S \qquad \text{Expression 3}$$

In the case in which the fluid is a viscous fluid, the conductance C can be calculated using Expression 4.

$$C = \pi \cdot D^4 \cdot (P_0 - P_1)/(128 \cdot \eta \cdot L) \qquad \text{Expression 4}$$

where, D is the diameter in the case in which the through hole is in a circular shape, and $\eta$ is a viscosity coefficient, and L is the length of the through hole.

When the first vacuum chamber 101 according to the present embodiment is taken as an example, $P_0$ is an atmospheric pressure, S is the exhaust velocity of the first vacuum pump 106, and C is the conductance of the first through hole 103, and thus the pressure $P_1$ of the first vacuum chamber 101 can be predicted.

In the present embodiment, the mass spectrometer 100 includes a vacuum gage 112 that measures the pressure of the first vacuum chamber 101. The vacuum gage 112 transmits a signal expressing the measured pressure to the controller 111. The controller 111 receives this signal, and memorizes information expressing the pressure.

The mass spectrometer 100 includes an adjustment unit that adjusts the effective exhaust velocity of the first vacuum pump 106, and the controller 111 controls this adjustment unit. In the present embodiment, this adjustment is adjustment to the number of revolutions of the first vacuum pump 106, i.e., the controller 111 controls the number of revolutions of the first vacuum pump 106 to adjust the effective exhaust velocity of the first vacuum pump 106. A person skilled in the art can appropriately design the specific structure and disposition of the adjustment unit. For example, the controller 111 may execute a predetermined adjustment program to transmit a signal instructing the number of revolutions to the first vacuum pump 106. In this case, it can also be considered that the controller 111 configures the adjustment unit. Alternatively, the first vacuum pump 106 may include a number-of-revolution control mechanism such as an inverter circuit. In this case, it can also be considered that the number-of-revolution control mechanism configures the adjustment unit. The adjustment unit is not necessary to be collectively disposed at one place, and the adjustment unit may be disposed being distributed to the controller 111 and the first vacuum pump 106. For example, the adjustment unit may be configured including the controller 111 and the number-of-revolution control mechanism of the first vacuum pump 106.

The mass spectrometer 100 may further include the adjustment unit that adjusts the effective exhaust velocity of the second vacuum pump 105. The adjustment unit of the second vacuum pump 105 can also be configured similarly to the adjustment unit of the first vacuum pump 106.

The controller 111 may be connected to the first vacuum pump 106 and the second vacuum pump 105 with a communication cable. The control of the number of revolutions by the adjustment unit may be achieved using communication through this communication cable. The controller may record a change in the operation states of the first vacuum pump 106 and the second vacuum pump 105. For example, in regard to the vacuum pumps, the operation start time, the operation stop time, the number of revolutions at every predetermined time interval, and the like may be recorded.

Next, in the present embodiment, the principle of adjusting the pressure of the vacuum chamber in the case in which the outside air pressure changes will be described. In the present embodiment, it is assumed that the pressure $P_1$ of the first vacuum chamber 101 has to decease to a degree that the pressure can be ignored to the atmospheric pressure $P_0$ (e.g., $P_1 < P_0/100$). In such a case in which $P_0 - P_1$ can be approximated to $P_0$ in Expression 4 described above, and thus Expression 5 is obtained.

$$C = \pi \cdot D^4 \cdot P_0/(128 \cdot \eta \cdot L) \quad \text{Expression 5}$$

Here, $\pi \cdot D^4/(128 \cdot \eta \cdot L)$ is replaced with a constant k, and $C = k \cdot P_0$ is obtained, where, k is a constant determined depending on the shape (diameter, length, and the like) of the first through hole 103 and the viscosity coefficient. When this is substituted into Expression 3 described above to express $P_1$, Expression 6 is obtained.

$$P_1 = k \cdot P_0^2/S \quad \text{Expression 6}$$

As described above, $P_1$ is proportional to the square of $P_0$.

Here, for example, it is assumed that the atmospheric pressure is decreased to 0.7 times the value, which is originally assumed, and the effective exhaust velocity of the first vacuum pump 106 is not changed, from Expression 6 described above, the pressure of the first vacuum chamber 101 is to decrease to 0.49 times the reference value, which is originally assumed. In this case, in order to return the pressure of the first vacuum chamber 101 to the original reference value, the effective exhaust velocity only has to be set 0.49 times the original reference effective exhaust velocity.

Generally, in the case in which the mass spectrometer 100 is designed such that the pressure of the first vacuum chamber 101 is the reference value $P_1$ at the effective exhaust velocity S under a specific atmospheric pressure, when the pressure of the first vacuum chamber 101 becomes $P_1'$, the effective exhaust velocity $S'$ after adjusted only has to be controlled so as to satisfy Expression 7.

$$S' = S \cdot P_1'/P_1 \quad \text{Expression 7}$$

Next, referring to a flowchart in FIG. 1(b), an example of a control method of the mass spectrometer 100 based on such a principle will be described. The process shown in FIG. 1(b) is executed by the controller 111, for example. First, the controller 111 memorizes the reference value of the pressure of the first vacuum chamber 101 (Step S1). For example, a user of the mass spectrometer 100 determines and inputs this reference value, and the controller 111 receives and memorizes this input. Although a method of determining the reference value by the user is optional, for example, under a specific atmospheric pressure (e.g., 101.3 kPa, which is not limited), the first vacuum pump 106 is operated at the effective exhaust velocity S, the pressure of the first vacuum chamber 101 in the state in which the pressure reaches the equilibrium state can be used as the reference value. At this time, the second vacuum pump 105 may be operated as necessary.

Although this reference value may be determined by actually measuring the pressure of the first vacuum chamber 101 under a specific atmospheric pressure as described above, the reference value may be calculated based on Expression 3 described above. When actual measurement under a typical atmospheric pressure is not affected by the altitude or weather, and the electrode voltage parameter can be kept constant.

Although not shown in FIG. 1(b), after Step S1, the atmospheric pressure around the mass spectrometer 100 fluctuates. For example, the mass spectrometer 100 is carried and moved to a spot at a higher altitude, and thus the atmospheric pressure is decreased.

The controller 111 acquires the value expressing the pressure of the first vacuum chamber 101 from the vacuum gage 112 (Step S2). For example, this Step S2 is executed in the state in which the first vacuum pump 106 is operated at the effective exhaust velocity S and the pressure reaches the equilibrium state. At this time, the second vacuum pump 105 may be operated as necessary.

Here, according to the above-described principle, when the effective exhaust velocity of the first vacuum pump 106 is constant, the pressure of the first vacuum chamber 101 fluctuates depending on the atmospheric pressure, and thus it can be said that the pressure of the first vacuum chamber 101 indirectly expresses the atmospheric pressure (or a change in the atmospheric pressure). In other words, it can be said that the value acquired from the vacuum gage 112 can be the value relating to the atmospheric pressure (the atmospheric pressure relating value), and that the vacuum gage 112 constitutes the atmospheric pressure relating value acquiring unit. The atmospheric pressure can be calculated or estimated based on the atmospheric pressure relating value using a predetermined function, table, or the like, for example.

Subsequently, the controller 111 controls the adjustment unit such that the pressure of the first vacuum chamber 101 becomes the reference value depending on the value expressing the pressure of the first vacuum chamber 101 (the atmospheric pressure relating value), and controls the number of revolutions of the first vacuum pump 106 (Step S3). This control is performed in which reference is made to the memorized reference value, for example, according to Expression 7 described above. That is, based on the ratio of the pressure value measured by the vacuum gage 112 to the reference value before changed, the number of revolutions of the first vacuum pump 106 is controlled. As a result, the pressure of the first vacuum chamber 101 is recovered to the reference value.

As described above, in accordance with the mass spectrometer 100 according to the first embodiment, the pressure of the first vacuum chamber 101 is corrected, and thus it is possible to more appropriately maintain the pressure.

Specifically, it is possible to obtain the effect that a problem that appropriately maintains the atmospheric pressure of the first vacuum chamber 101 is solved by controlling the number of revolutions of the first vacuum pump 106 depending on the pressure value measured by the vacuum gage 112 and that the atmospheric pressure of the first vacuum chamber 101 is more appropriately maintained. It is possible to obtain the effect that the pressure of the first vacuum chamber 101 is measured by the vacuum gage 112, without directly measuring the atmospheric pressure.

Therefore, for example, it is possible to appropriately maintain the frequency of the collision of ions against neutral molecules in the inside of the first vacuum chamber 101, and thus it is possible to achieve stable measurement without separately adjusting the voltage parameter of the ion lens and the like.

Second Embodiment

In the first embodiment, the adjustment of the effective exhaust velocity of the first vacuum pump is achieved by controlling the number of revolutions of the first vacuum pump. A second embodiment is configured in which this adjustment is achieved by the admission of a gas. In the following, differences from the first embodiment will be described.

Figure 2:
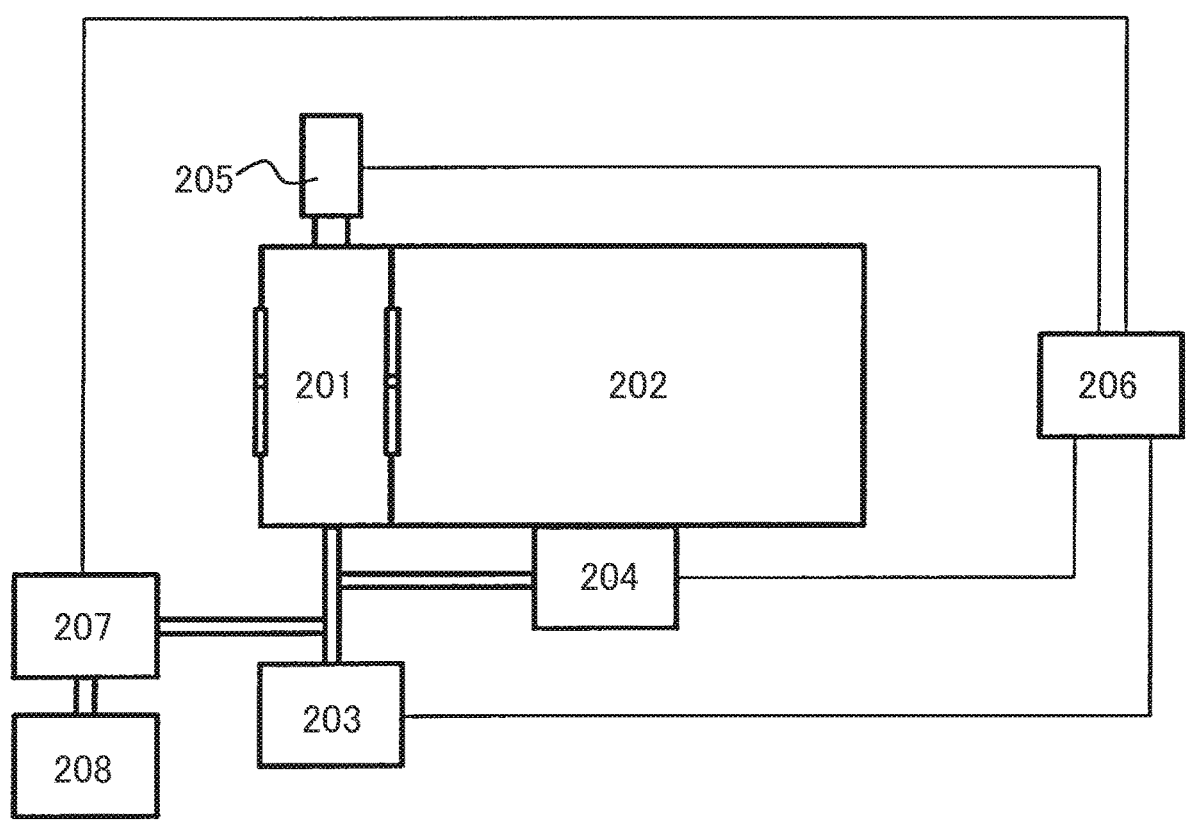
FIG. 2 is a diagram showing an exemplary schematic configuration of a mass spectrometer according to a second embodiment of the present invention.

FIG. 2 shows an exemplary schematic configuration of a mass spectrometer 200 according to the second embodiment of the present invention. The mass spectrometer 200 includes a first vacuum chamber 201, a second vacuum chamber 202, a first vacuum pump 203, a second vacuum pump 204, and a vacuum gage 205. The configurations and operations of these components are similar to the components having the same names of the first embodiment.

The mass spectrometer 200 includes a controller 206. The configuration and operation of the controller 206 is similar to the controller 111 of the first embodiment, except the points described below.

The mass spectrometer 200 includes a gas flow rate controller 207 and a gas supply source 208. The gas supply source 208 supplies a gas to the first vacuum pump 203. Here, as shown in FIG. 2, the gas may be supplied between the first vacuum chamber 201 and the first vacuum pump 203, may be supplied to the first vacuum chamber 201, or may be supplied to the first vacuum pump 203. The gas flow rate controller 207 controls the flow rate of a gas supplied from the gas supply source 208.

The adjustment unit in the present embodiment is configured including the gas flow rate controller 207 and the gas supply source 208. When a gas is supplied from the gas supply source 208 to the first vacuum pump 203, the capacity of the first vacuum pump 203 that exhausts a gas from the first vacuum chamber 201 is decreased, and it can be said that the effective exhaust velocity of the first vacuum pump 203 is decreased. As described above, the gas flow rate controller 207 controls the flow rate of a gas supplied from the gas supply source 208, and adjusts the effective exhaust velocity of the first vacuum pump 203.

Here, pressure formation in the vacuum chamber in the present embodiment will be described. Generally, the inflow $Q_{in}$ that enters from the atmosphere to the vacuum chamber is expressed using the conductance C and the atmospheric pressure $P_0$ at the through hole to the atmosphere. However, in the present embodiment, an inflow $Q_{ext}$ of a gas that is introduced from the outside is introduced to correct the pressure of the vacuum chamber. The inflow $Q_{ext}$ is expressed by Expression 8 using a pressure $P_{ext}$ of a gas supplied from the gas supply source and a flow rate $S_{ext}$ set by the gas flow rate controller.

$$Q_{ext} = P_{ext} \cdot S_{ext} \qquad \text{Expression 8}$$

In the present embodiment, in the state in which the pressure of the vacuum chamber reaches equilibrium, Expression 9 is held in regard to the inflow and outflow of a gas.

$$Q_{in} + Q_{ext} = Q_{out} \qquad \text{Expression 9}$$

where, $Q_{out}$ is the outflow of a gas going out from the vacuum chamber (e.g., a gas evacuated from the vacuum pump and the like).

When Expressions 1, 2 and 8 are substituted into Expression 9, the flow rates are expressed by pressure, and Expression 10 is obtained.

$$P_0 \cdot C + P_{ext} \cdot S_{ext} = P_1 \cdot S \qquad \text{Expression 10}$$

When Expression 10 is expressed on the pressure of the vacuum chamber $P_1$ similarly to Expression 6, Expression 11 is held.

$$P_1 = (k \cdot P_0^2/S) + (P_{ext} \cdot S_{ext}/S) \qquad \text{Expression 11}$$

In Expression 11, since the term $P_{ext} \cdot S_{ext}/S$ is added, the value of this term is changed, and thus the value of pressure $P_1$ can be changed. In the present embodiment, the effective exhaust velocity S of the first vacuum pump 203 is made constant, and the value of $P_{ext} \cdot S_{ext}$ is changed. For example, the value of $P_{ext} \cdot S_{ext}$ can be changed by changing the flow rate $S_{ext}$ set by the pressure $P_{ext}$ of the gas supply source 208 or the gas flow rate controller 207.

The mass spectrometer 200 according to the second embodiment can be controlled using a method similar to FIG. 1(b) according to the first embodiment. However, in the second embodiment, in Step S3, the controller 206 changes $P_{ext}$ or $S_{ext}$ (or both), and controls the flow rate of a gas supplied from the gas supply source 208. As a result, the pressure of the first vacuum chamber 201 is recovered to the reference value.

As described above, in accordance with the mass spectrometer 200 according to the second embodiment, the pressure of the first vacuum chamber 201 is corrected, and thus it is possible to more appropriately maintain the pressure.

Specifically, it is possible to obtain the effect that a problem that appropriately maintains the atmospheric pressure of the first vacuum chamber 201 is solved by controlling the flow rate of a gas supplied from the gas supply source 208 depending on the pressure value measured by the vacuum gage 205, and that the atmospheric pressure of the first vacuum chamber 201 is more appropriately maintained. It is possible to obtain the effect that the direct measurement of the atmospheric pressure can be substituted for the measurement of the pressure of the first vacuum chamber 201 by the vacuum gage 205.

Third Embodiment

A third embodiment is configured in which the adjustment of the effective exhaust velocity of the first vacuum pump is achieved by decreasing the pipe conductance using a flow rate control valve. In the following, differences from the first embodiment will be described.

Figure 3:
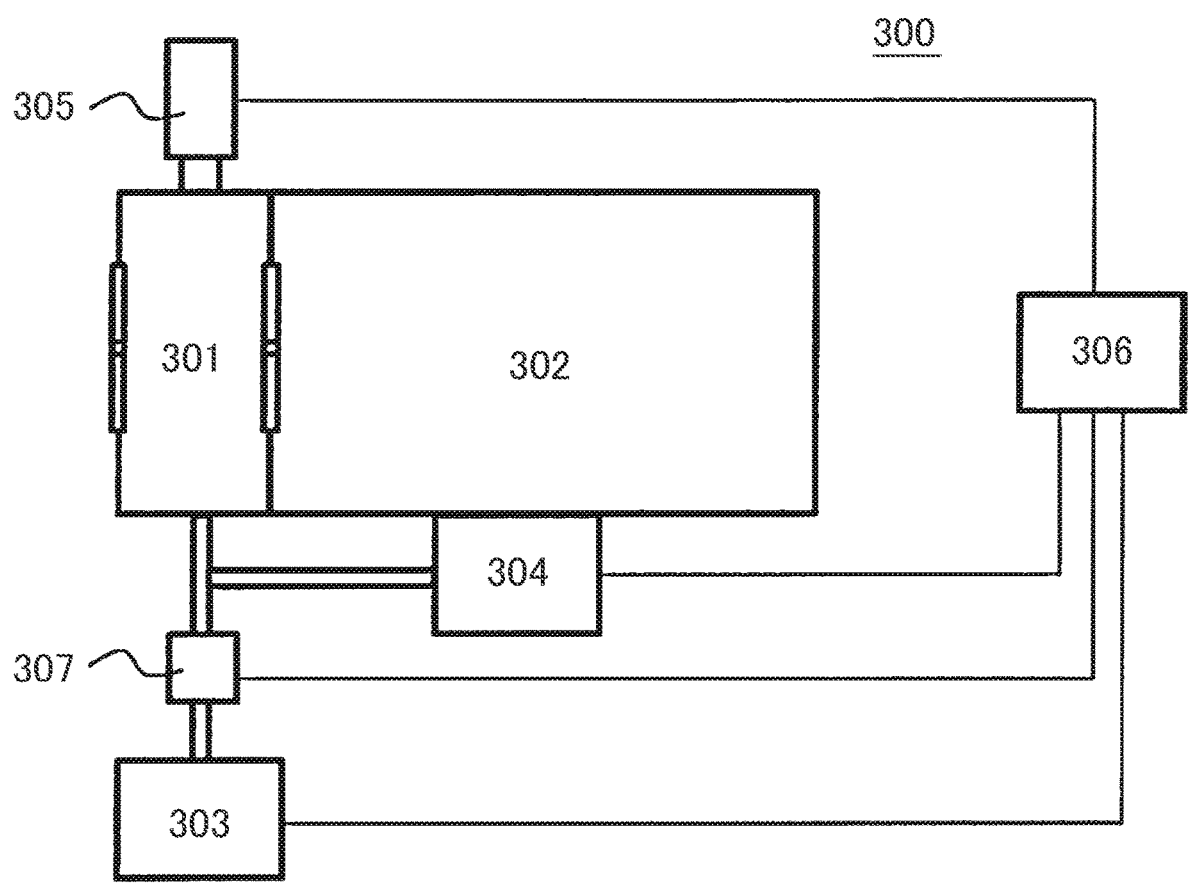
FIG. 3 is a diagram showing an exemplary schematic configuration of a mass spectrometer according to a third embodiment of the present invention.

FIG. 3 shows an exemplary schematic configuration of a mass spectrometer 300 according to the third embodiment of the present invention. The mass spectrometer 300 includes a first vacuum chamber 301, a second vacuum chamber 302, a first vacuum pump 303, a second vacuum pump 304, and a vacuum gage 305. The configurations and operations of these components are similar to the components having the same names in the first embodiment.

The mass spectrometer 300 includes a controller 306. The configuration and operation of the controller 306 are similar to the controller 111 of the first embodiment, except the points described below.

The mass spectrometer 300 includes a flow rate control valve 307. The flow rate control valve 307 is provided on the vacuum pipe of the first vacuum pump 303. In the example of FIG. 3, the flow rate control valve 307 is disposed between the first vacuum chamber 301 and the first vacuum pump 303. The adjustment unit according to the present embodiment is configured including this flow rate control valve 307.

Here, pressure formation in the vacuum chamber in the present embodiment will be described. First, in consideration of the conductance of the vacuum pipe, the effective exhaust velocity S of the vacuum pump is determined by Expression 12.

$$1/S = (1/S_p) + (1/C_t) \qquad \text{Expression 12}$$

where, $S_p$ is a true exhaust velocity of the vacuum pump, and is the maximum exhaust velocity that can be attained by the vacuum pump under ideal conditions in which the conductance is infinite. $C_t$ is the conductance of the vacuum pipe connecting the vacuum pump to the vacuum chamber. From Expression 12, the effective exhaust velocity S of the vacuum pump is a value lower than the true exhaust velocity $S_p$ depending on the conductance of the vacuum pipe.

In the present embodiment, an additional conductance $C_r$ occurs in the vacuum pipe by the flow rate control valve 307. The effective exhaust velocity S of the vacuum pump in the present embodiment is expressed by Expression 13.

$$1/S=(1/S_p)+(1/C_t)+(1/C_r) \qquad \text{Expression 13}$$

The conductance $C_r$ by the flow rate control valve 307 can be changed by changing an opening amount, for example. The conductance $C_r$ of the flow rate control valve 307 is changed (e.g., decreased), the effective exhaust velocity S of the first vacuum pump 303 can be changed (e.g., decreased). This is equivalent to changing S in Expression 6, and as a result, the pressure $P_1$ in the vacuum chamber can be corrected.

The mass spectrometer 300 according to the third embodiment can be controlled using a method similar to FIG. 1(*b*) according to the first embodiment. However, in the third embodiment, in Step S3, the opening amount of the flow rate control valve 307 is controlled to adjust the effective exhaust velocity of the first vacuum pump 303. As a result, the pressure of the first vacuum chamber 301 is recovered to the reference value.

As described above, in accordance with the mass spectrometer 300 according to the third embodiment, the pressure of the first vacuum chamber 301 is corrected, and thus it is possible to more appropriately maintain the pressure.

Specifically, it is possible to obtain the effect that a problem that appropriately maintains the atmospheric pressure of the first vacuum chamber 301 is solved by controlling the opening amount of the flow rate control valve 307 depending on the pressure value measured by the vacuum gage 205 and that the atmospheric pressure of the first vacuum chamber 301 is more appropriately maintained. It is possible to obtain the effect that the direct measurement of the atmospheric pressure can be substituted for the measurement of the pressure of the first vacuum chamber 301 by the vacuum gage 305.

Fourth Embodiment

In the first to the third embodiments, the pressure of the first vacuum chamber 101 is indirectly used as the value relating to the atmospheric pressure (the atmospheric pressure relating value). A fourth embodiment is configured in which as the atmospheric pressure relating value, an atmospheric pressure that is more directly measured. In the following, differences from the first embodiment will be described.

Figure 4:
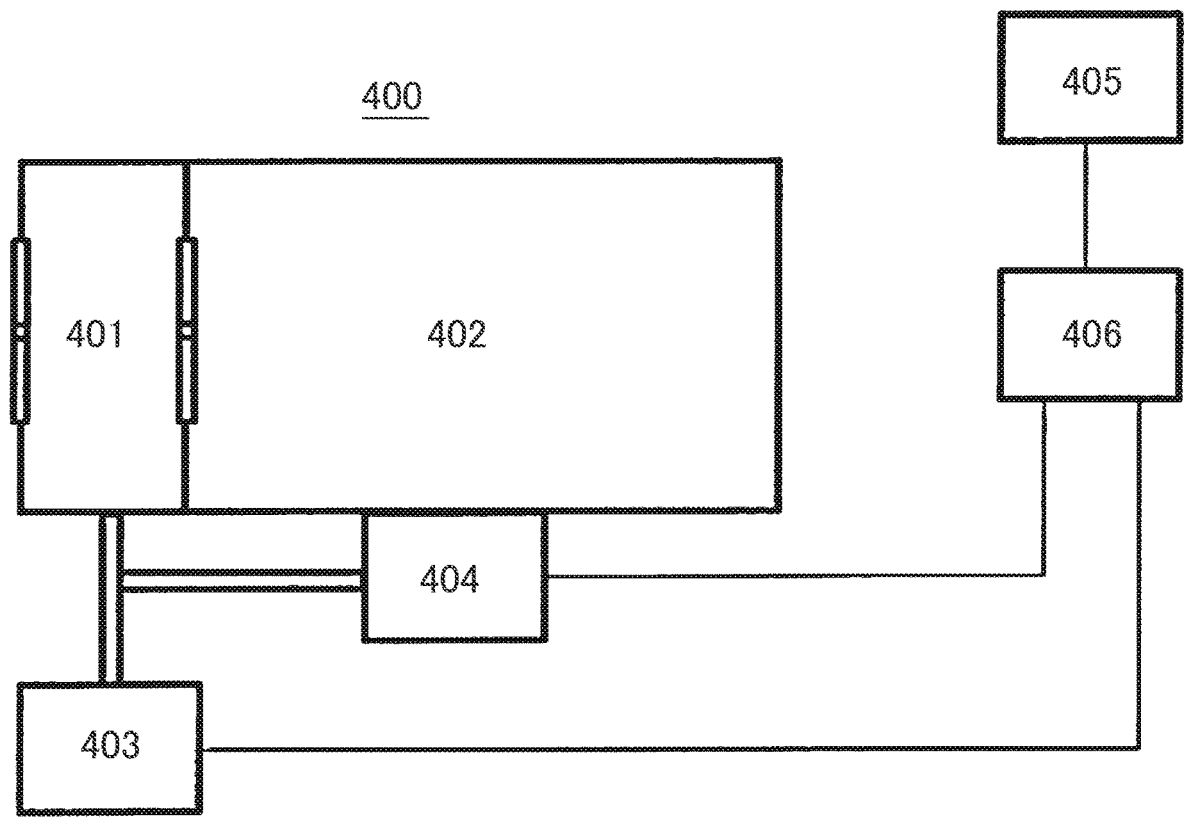
FIG. 4 is a diagram showing an exemplary schematic configuration of a mass spectrometer according to a fourth embodiment of the present invention.

FIG. 4 shows an exemplary schematic configuration of a mass spectrometer 400 according to the fourth embodiment of the present invention. The mass spectrometer 400 includes a first vacuum chamber 401, a second vacuum chamber 402, a first vacuum pump 403, and a second vacuum pump 404. The configurations and operations of these components are similar to the components having the same names in the first embodiment.

The mass spectrometer 400 includes a controller 406. The configuration and operation of the controller 406 are similar to the controller 111 of the first embodiment, except the points described below.

The mass spectrometer 400 includes an atmospheric pressure gage 405. The atmospheric pressure gage 405 measures the atmospheric pressure, and transmits a signal expressing the measured atmospheric pressure to the controller 406. The controller 406 receives this signal, and memorizes information expressing the atmospheric pressure. In the present embodiment, the value expressing the atmospheric pressure (e.g., the atmospheric pressure itself) is an atmospheric pressure relating value, and the atmospheric pressure gage 405 is the atmospheric pressure relating value acquiring unit.

As expressed in Expression 1, the inflow $Q_{in}$ of a gas to the vacuum chamber is proportional to the atmospheric pressure $P_0$. Therefore, when the atmospheric pressure is decreased, the pressure in the vacuum chamber is also decreased as Expression 6. Therefore, the effective exhaust velocity of the vacuum pump is adjusted by the adjustment unit depending on the decreased atmospheric pressure. For the configuration of the adjustment unit, for example, anyone in the first to the third embodiments can be used.

Generally, in the case in which the mass spectrometer 100 is designed such that the pressure of the first vacuum chamber 101 is the reference value at the effective exhaust velocity S under a specific reference atmospheric pressure $P_0$, when the pressure of the first vacuum chamber 101 becomes $P_1'$, the effective exhaust velocity S' after adjusted only has to be controlled so as to satisfy Expression 14.

$$S'=S \cdot P_0'/P_0 \qquad \text{Expression 14}$$

As described above, in accordance with the mass spectrometer 400 according to the fourth embodiment, the pressure of the first vacuum chamber 401 is corrected, and thus it is possible to more appropriately maintain the pressure.

Specifically, it is possible to obtain the effect that a problem that appropriately maintains the atmospheric pressure of the first vacuum chamber 401 is solved by adjusting the effective exhaust velocity of the first vacuum pump 403 depending on the atmospheric pressure measured by the atmospheric pressure gage 405 and that the atmospheric pressure of the first vacuum chamber 401 is more appropriately maintained. It is possible to obtain the effect that the direct measurement of the vacuum gage is unnecessary by directly measuring the atmospheric pressure.

Fifth Embodiment

In the first to the fourth embodiments, the value relating to the atmospheric pressure (the atmospheric pressure relating value) is measured and used. A fifth embodiment is configured in which the atmospheric pressure relating value is not measured and the atmospheric pressure relating value is externally received. In the following, differences from the fourth embodiment will be described.

Figure 5:
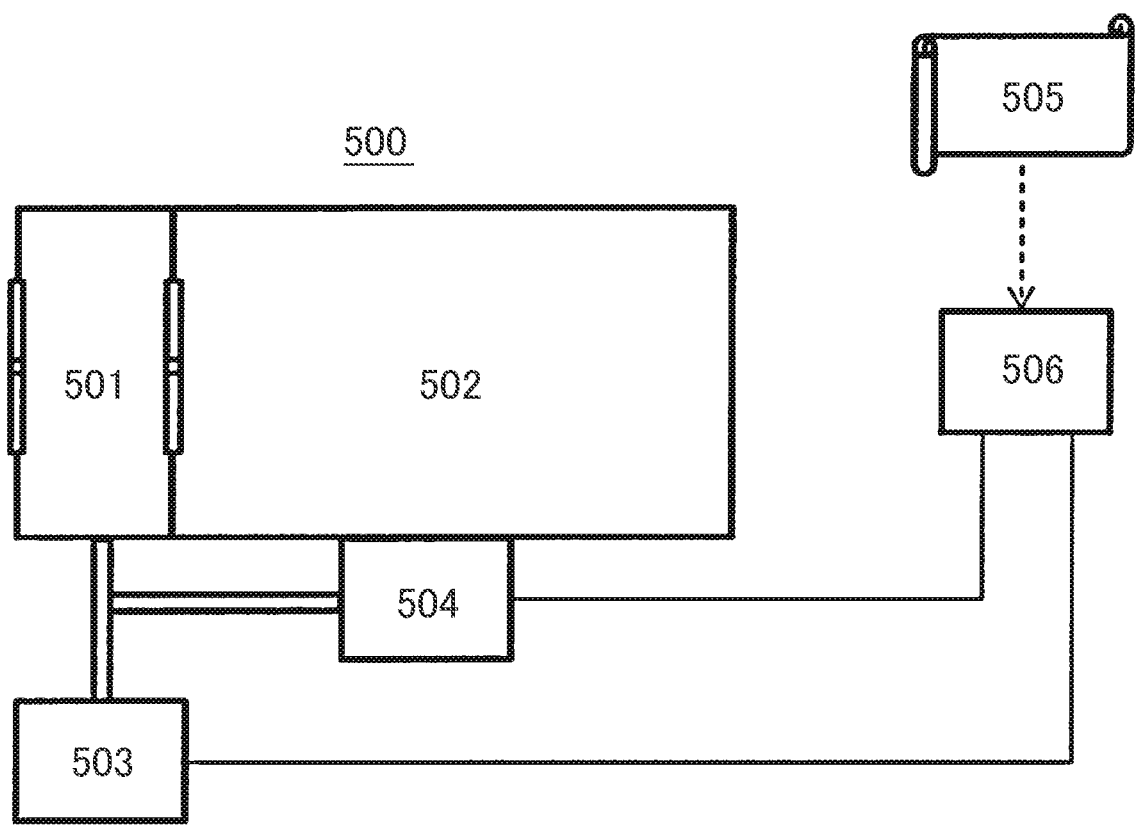
FIG. 5 is a diagram showing an exemplary schematic configuration of a mass spectrometer according to a fifth embodiment of the present invention.

FIG. 5 shows an exemplary schematic configuration of a mass spectrometer 500 according to the fifth embodiment of the present invention. The mass spectrometer 500 includes a first vacuum chamber 501, a second vacuum chamber 502, a first vacuum pump 503, and a second vacuum pump 504. The configurations and operations of these components are similar to the components having the same names in the fourth embodiment.

The mass spectrometer 500 includes a controller 506. The configuration and operation of the controller 506 are similar to the controller 406 of the fourth embodiment except the points described below.

The controller 506 can acquires and memorize external data 505 in a storage unit. The external data 505 may be any data when the data is the value relating to the atmospheric pressure (the atmospheric pressure relating value). For example, the external data 505 can be data expressing the atmospheric pressure at a location in which the mass spectrometer 500 is installed. As described above, in the present embodiment, the controller 506 is the atmospheric pressure relating value acquiring unit.

The input method of the external data 505 can be freely designed. For example, the external data 505 can be inputted through the input interface of the controller 506. The input interface may be a unit such as a keyboard and a mouse operated by a human, may be a communication network (the Internet and the like) that achieves communication with another computer, or may be another unit.

The operation of the mass spectrometer 500 after the atmospheric pressure relating value is acquired can be configured similar to the mass spectrometer 400 of the fourth embodiment. For example, similarly to the fourth embodiment, the effective exhaust velocity of the vacuum pump is adjusted by the adjustment unit depending on the atmospheric pressure. For the configuration of the adjustment unit, for example, any one in the first to the third embodiments can be used.

As the data expressing the atmospheric pressure, various physical quantities can be used. For example, the data may be the measured value of the atmospheric pressure. Alternatively, the data may be data expressing the altitude and the temperature of a location in which the mass spectrometer 500 is installed. In such a case, the atmospheric pressure can be calculated using Expression 15.

$$P_h = P_{atm}\{1 - 0.0065 \cdot h/(T + 0.0065 \cdot h + 273.15)\}^{5.257} \quad \text{Expression 15}$$

where, $P_h$ is the atmospheric pressure to be calculated, $P_{atm}$ is constant 101325 pascals, h is the altitude (m), and T is the temperature ° C.

As described above, in accordance with the mass spectrometer 500 according to the fifth embodiment, the pressure of the first vacuum chamber 501 is corrected, and thus it is possible to more appropriately maintain the pressure.

Specifically, it is possible to obtain the effect that a problem that appropriately maintains the atmospheric pressure of the first vacuum chamber 501 is solved by adjusting the effective exhaust velocity of the first vacuum pump 503 depending on the external data 505 and that the atmospheric pressure of the first vacuum chamber 501 is more appropriately maintained. It is possible to obtain the effect that with the use of the external data 505, the configuration of measuring the atmospheric pressure (e.g., the vacuum gage or the atmospheric pressure gage) is unnecessary.

In the forgoing first to the fifth embodiments, the reference value of the first pressure of the vacuum chamber may be corrected depending on the type of analysis target substance.

In the first to the fifth embodiments, the timing of executing Steps S2 and S3 can be freely designed. For example, in the first to the third embodiments, Steps S2 and S3 may be executed in the installation work of the mass spectrometer. In the fourth and the fifth embodiments, Steps S2 and S3 may be executed in the installation work of the mass spectrometer, may be executed sequentially, or may be executed every time when the analysis target substance is changed.

LIST OF REFERENCE SIGNS 100, 200, 300, 400, 500: mass spectrometer
101, 201, 301, 401, 501: first vacuum chamber
102, 202, 302, 402, 502: second vacuum chamber
103: first communication hole
104: second communication hole
106: first vacuum pump (adjustment unit)
203, 303, 403, 503: first vacuum pump
105, 204, 304, 404, 504: second vacuum pump
107: ion source
108: ion guide
109: electrode
110: detector
111: controller (adjustment unit)
206, 306, 406: controller
506: controller (atmospheric pressure relating value acquiring unit)
112, 205, 305: vacuum gage (atmospheric pressure relating value acquiring unit)
207: gas flow rate controller (adjustment unit)
208: gas supply source (adjustment unit)
307: flow rate control valve (adjustment unit)
405: atmospheric pressure gage (atmospheric pressure relating value acquiring unit)
505: external data (atmospheric pressure relating value)
S2: step (step of acquiring an atmospheric pressure relating value)
S3: step (step of controlling an adjustment unit)

What is claimed is:

1. A mass spectrometer comprising:
a first vacuum chamber;
a first communication hole configured to communicate an atmosphere with the first vacuum chamber;
a first vacuum pump configured to evacuate air from the first vacuum chamber;
an atmospheric pressure relating value acquiring unit configured to acquire an atmospheric pressure relating value relating to an atmospheric pressure;
an adjustment unit configured to adjust an effective exhaust velocity of the first vacuum pump; and
a controller configured to control the adjustment unit,
wherein: the controller acquires the atmospheric pressure relating value and controls the adjustment unit such that a pressure of the first vacuum chamber is a predetermined reference value corresponding to the atmospheric pressure relating value; and
the atmospheric pressure relating value is a value indicating an atmospheric pressure.

2. The mass spectrometer according to claim 1, wherein the controller stores the reference value, and controls the adjustment unit with reference to the reference value.

3. The mass spectrometer according to claim 1, wherein the atmospheric pressure relating value acquiring unit is an atmospheric pressure gage.

4. The mass spectrometer according to claim 1, wherein the adjustment unit adjusts the effective exhaust velocity of the first vacuum pump by controlling a number of revolutions of the first vacuum pump.

5. The mass spectrometer according to claim 1,
wherein: the adjustment unit includes a gas supply source;
the gas supply source supplies a gas to the first vacuum chamber, or to the first vacuum pump, or between the first vacuum chamber and the first vacuum pump; and
the adjustment unit adjusts the effective exhaust velocity of the first vacuum pump by controlling a flow rate of the gas supplied from the gas supply source.

6. The mass spectrometer according to claim 1,
wherein: the adjustment unit includes a flow rate control valve provided between the first vacuum chamber and the first vacuum pump; and
the adjustment unit adjusted the effective exhaust velocity of the first vacuum pump by controlling an amount of opening of the flow rate control valve.

7. The mass spectrometer according to claim 1, further comprising:
   a second vacuum chamber;
   a second communication hole configured to communicate the second vacuum chamber with the first vacuum chamber; and
   a second vacuum pump configured to evacuate air from the second vacuum chamber.

8. A method of controlling a mass spectrometer including
a first vacuum chamber,
a first communication hole configured to communicate an atmosphere with the first vacuum chamber,
a first vacuum pump configured to evacuate air from the first vacuum chamber,
an atmospheric pressure relating value acquiring unit configured to acquire an atmospheric pressure relating value relating to an atmospheric pressure,
an adjustment unit configured to adjust an effective exhaust velocity of the first vacuum pump, and
a controller configured to control the adjustment unit,
the method comprising the steps of:
acquiring the atmospheric pressure relating value by the controller; and
controlling the adjustment unit by the controller such that a pressure of the first vacuum chamber is a predetermined reference value corresponding to the atmospheric pressure relating value,
wherein the atmospheric pressure relating value is a value indicating an atmospheric pressure.

\* \* \* \* \*